United States Patent [19]
Gudermuth, Jr.

[11] Patent Number: 5,129,176
[45] Date of Patent: Jul. 14, 1992

[54] SPOON-TYPE FISHING LURE
[75] Inventor: Clyde S. Gudermuth, Jr., Fort Smith, Ark.
[73] Assignee: Ebsco Industries, Inc., Leeds, Ala.
[21] Appl. No.: 773,517
[22] Filed: Oct. 9, 1991

Related U.S. Application Data
[63] Continuation-in-part of Ser. No. 532,666, Jun. 4, 1990, abandoned.

[51] Int. Cl.$^5$ ............................................. A01K 85/00
[52] U.S. Cl. ..................................... 43/42.52; 43/42.4
[58] Field of Search ................... 43/42.5, 42.52, 42.42, 43/42.45, 42.51, 42.53, 42.4, 42.37

[56] References Cited
U.S. PATENT DOCUMENTS

| | | | |
|---|---|---|---|
| 1,939,291 | 12/1933 | Buddle | 42/39 |
| 2,167,163 | 7/1939 | Toepper | 43/39 |
| 2,468,988 | 5/1949 | Lobdell | 43/42 |
| 2,535,211 | 12/1950 | Jelinek | 43/42.5 |

OTHER PUBLICATIONS
Pages 54 and 55 of Cabela's 1990 Spring Catalog.

Primary Examiner—Richard K. Seidel
Assistant Examiner—James Miner
Attorney, Agent, or Firm—Laney, Dougherty, Hessin & Beavers

[57] ABSTRACT

A spoon-type fishing lure which includes a light reflective metallic plate of a trapezium configuration resembling an arrowhead, and having a V-shape in cross-sectional configuration. The metallic plate has a center line or longitudinal crease extending from a forward end to a rear end thereof. A wire element forms a hook having a barb near the forward end of the arrowhead-shaped plate, and having a shank portion lying along the longitudinal crease of the plate and secured to the plate at that location. A weed guard wire extends from the front or leading end of the spoon rearwardly at an acute angle to the shank portion of the hook, with the weed guard terminating adjacent the barb of the hook at a location spaced outwardly from the plate.

2 Claims, 1 Drawing Sheet

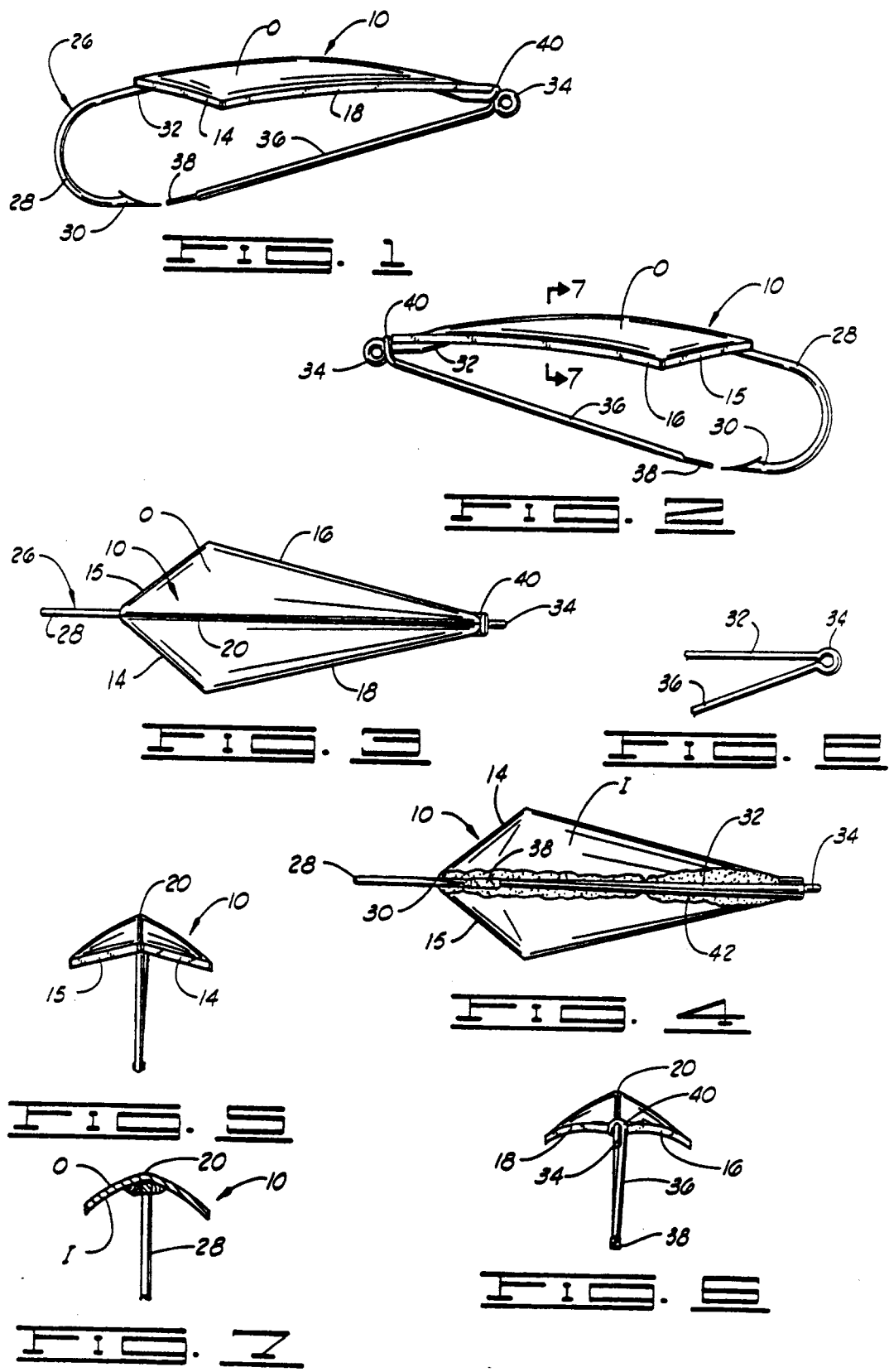

SPOON-TYPE FISHING LURE

RELATED APPLICATION

This application contains subject matter which is related to Clyde S. Gudermuth, Jr. co-pending U.S. patent application Ser. No. 07/532,666, filed on Jun. 4, 1990, entitled "SPOON-TYPE FISHING LURE", now abandoned, and is a continuation-in-part of that application.

BACKGROUND OF THE PRESENT INVENTION

1. Field Of The Invention

This invention relates to fishing lures, and more particularly, to fishing lures of the type which employ a light reflective spoon as a part of the lure.

2. Brief Description Of The Prior Art

Toepper U.S. Pat. 2,167,163 discloses a fish bait which has a dished metallic plate which is truncated at one of its ends and has a retrieving line hole formed therethrough at its other end. A hook is mounted centrally on the plate. The hook is mounted on the plate by means of bands or tabs punched out of the plate and extending into the concavity on the dished side of the plate. The eye of the hook is then passed underneath one of these punched out tabs, and the shank, where it joins the bight portion of the hook, can be extended underneath another band formed by forcing a part of the plate upwardly out of the major plane of the plate.

A pair of small wires function as weed guard wires projecting upwardly on the concave side of the plate in a direction toward the barb of the hook. These weed guard wires are, similarly to the shank of the hook, extended under a small band or loop which is stamped out of the plate by cutting a pair of parallel lines through the plate adjacent its center line and forcing a protuberant band loop upwardly out of the plate on its concave or dished side. The ends of the two weed guard wires are then bent back, and the end portions of the wires forced under the loop pressed out of the metal plate.

As previously indicated, an aperture or opening is cut through one end of the plate, and the other end is truncated or squared off.

Yet another slot is cut out of one end portion of the plate to accommodate a swivel eye and an elongated pork rind attached to the plate through the swivel eye. These holes and bridges or bands which are cut through and forced out of the metallic plate give it altogether different hydrodynamic properties, as it is pulled through the water on retrieve, from those which would characterize a solid, unperforated spoon.

The Toepper lure requires substantial machining to form the bands or loops out of the plate, and stamp the necessary holes and tabs therefrom. Moreover, the shank portion of the hook carried by the bait does not touch the plate over a major portion of its length, and thus allows impaction or accumulation of dirt, slime and other debris in the space between the shank of the hook and the concavity therebelow and forming a part of the plate.

Lobdell U.S. Pat. No. 2,468,988 discloses a fish lure in which a barb is secured to a concave side of a spoon plate. The barb is secured to the plate only by a shaped finger or hook catch which is formed integrally with the body of the spoon by punching or stamping the finger from the body in the direction of the concave or dished side of the spoon plate.

Another opening or slot is formed through the Lobdell lure near one end thereof, and this receives a tail portion bent out of the shank of the hook. It is believed, however, that there is not adequate anchorage of the shank of this hook to prevent it from pivoting or becoming canted with respect to a plane which bisects the axis of the spoon plate, and it is believed that it will not remain stable when clamped in the mouth of a fighting fish.

BRIEF DESCRIPTION OF THE PRESENT INVENTION

The present invention is a substantially weedless, spoon-type fishing lure which includes a reflective metallic plate of a trapezium configuration resembling an arrowhead, and having a V-shape in cross-sectional configuration. The metallic plate thus has a center line, or longitudinal crease, extending from the forward end to the rear end of the plate. A wire element forms a hook having a barb located near the rear end of the arrowhead-shaped plate, and a shank portion lying along the longitudinal crease of the plate. The shank portion is secured to the plate at that location over substantially the entire length of the plate by welding, brazing, soldering or the like. The plate is solid and unperforated over its entire areal extent.

In some embodiments of the lure, the hook and a weed guard wire used in the lure are formed as one integral and continuous unit. The weed guard wire, whether made integrally with the hook, or separately therefrom, extends from the forward or leading end of the metallic plate rearwardly at an acute angle to the shank portion of the hook, with the weed guard wire terminating adjacent the barb of the hook at a location spaced outwardly from the plate. The weed guard wire is thus oriented with respect to the hook, and particularly its barb, so that weeds and obstructions, which might otherwise be caught on the barb or impaled in some way on the hook, are deflected away from the hook by contact with, and deflection by, the weed guard.

An important object of the present invention is to provide a weedless spoon-type fishing lure which employs a specially curved, unperforated plate which gives good hydrodynamic action to the lure when it is retrieved, and which further includes a weed-deflecting weed guard extending from one end of the metallic plate outwardly to cooperate with a barbed hook to deflect brush and weeds away from the lure.

A further object of the invention is to provide a ruggedly constructed spoon-type lure where a major portion of the shank of the hook used in the lure is secured by brazing, soldering or the like to a major portion of the metallic plate, and where a pull eye is located at one end of the generally diamond-shaped metallic plate and is integrally formed with the hook.

Another object of the invention is to provide a spoon-type fishing lure in which the hook of the lure is formed integrally with a weed guard wire and the two are interconnected by a quick release retrieving line eye.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a side elevation view of a fishing lure constructed in accordance with the present invention.

FIG. 2 is a side elevation view of the opposite side of the fishing lure from that which is shown in FIG. 1.

FIG. 3 is a top plan view of the fishing lure shown in FIGS. 1 and 2.

FIG. 4 is a bottom plan view of the fishing lure.

FIG. 5 is a front elevation view of the fishing lure.

FIG. 6 is a rear elevation view of the fishing lure.

FIG. 7 is a sectional view taken along line 7—7 of FIG. 2.

FIG. 8 is a structural detail view in elevation, showing a structural modification used in a modified embodiment of the invention.

DETAILED DESCRIPTION OF A PREFERRED EMBODIMENT OF THE INVENTION

The spoon-type fishing lure of the invention includes a metallic spoon 10 which is a highly polished plate, or a plate which has been coated with a highly light reflective coating or finish. The metallic plate is in the general configuration of an arrowhead, or stated differently, is configured as a trapezium which includes a pair of convergent leading edges 14 and 15 and a pair of convergent rear or trailing edges 16 and 18. The metallic plate 10 is creased along a longitudinal center line 20. The plate 10 is thus made up of a pair of congruent triangles lying on opposite sides of the longitudinal center or crease line 20.

It will be noted by reference to FIGS. 1, 6 and 7 that the metallic plate 10 is curved in two planes, and that, in fact, each of the congruent triangle-forming halves of the metallic plate are so curved. Thus, the plate and each triangular half thereof has a bowed or arced configuration as viewed in a transverse dimension, and this can be perceived in FIG. 7 of the drawings.

Each of the congruent triangular halves of the metallic plate is also curved in a longitudinal plane, and this is perceived in the bowed or arcuate configuration which characterizes the longitudinal center line or crease 20 of the plate, and in the curved lateral or trailing edges 16 and 18 (see FIGS. 1-3). In referring to FIGS. 1 and 2, it will be noted that the outer side of the plate, which is that side facing toward the top of the page of the drawings, is arcuate or curved in configuration, and forms the convex side of the plate in the longitudinal plane. This side of the plate is denominated by the reference numeral "O" to indicate that it is the outer side in the sense described. The inside of the plate is concave and is denominated by reference letter "I" (as shown in FIG. 4).

In one embodiment of the invention which is particularly well adapted to the construction of larger sizes of the spoon-type lure, the hook and weed guard are made as two separate parts. The hook, denominated generally by reference numeral 26, includes a curved or bight portion 28 by which a barb 30 is connected to a shank portion 32. The elongated shank portion 32 of the hook 26 lies within the concave inner side of the metallic plate 10, and is brazed or otherwise suitably bonded along the longitudinal center line 20 of the plate as best illustrated in FIG. 4. This method of attachment avoids any need to perforate, slot or stamp the plate 10 so that it remains imperforate and its hydrodynamic properties are unimpaired. This line of securement or bonding extends from about one end of the plate to the other (see FIG. 4). At the end of the elongated shank 32 which lies opposite the end joined to the bight portion 28, the hook terminates in a substantially circular eye 34 which forms a pull point for the lure to which the fisherman's retrieving line can be attached.

An elongated weed guard shaft 36 extends from the leading end of the lure where the eye 34 is located to a point in close proximity to, and in very close alignment with, the barb 30 of the hook 26 (see FIGS. 1 and 2). The trailing end of the weed guard shaft 36 is flattened, as shown at 38 in FIGS. 1 and 4 of the drawings. This construction aids in avoiding fouling of the lure or impalement of the fingers of the fisherman.

In the embodiment of the invention illustrated in FIGS. 1-7, the weed guard shaft or wire 36 is secured to the metallic plate 10. The wire 36 forms a loop or bight 40 which wraps around the leading end of the shank portion 32 of the hook 26 immediately behind the eye 34 constituting the pull point of the lure. After looping around the shank portion 32 at this location, the weed guard wire 36 extends back alongside the shank 32 for a distance which is approximately from one-third to one-half the length of the lure as shown at 42 in FIG. 4. This portion 42 of the weed guard wire 36 lies in the longitudinal center line or crease 20 of the metallic plate 10, and is brazed or otherwise suitably secured to this plate.

In a different embodiment of the invention, the weed guard wire 36 is actually constructed from the same elongated wire as the entire hook 26. The weed guard wire 36 is thus formed by making the circular configuration required for the eye 34 located at one end of the shank 32 of the hook, and then, after completing this circular turn (through 360°) in the wire of the shank portion (see FIG. 8), bending the wire outwardly away from the remainder of the shank portion so that it passes into the path of the weed guard wire 36 which extends from the forward end of the lure to a location adjacent the barb 30 of the hook 26. This construction, in which the hook and the weed guard are made as a unitary integral part and from the same wire, is especially adapted for use in relatively smaller spoon-type fishing lures. It also provides the advantage of a quick-release retrieving line eye to which a retrieving line can be quickly attached and even more quickly released when desired.

From the foregoing description of the invention, it will be perceived that the general principles of the invention have been described in sufficient detail to enable one having ordinary skill in the art to practice the invention. It is also perceptible from the foregoing description, however, that some changes and innovations in the illustrated and described structure can be effected without departure from the basic principles of the invention. In essence, the weedless spoon-type lure of the invention will include a metallic plate of the general configuration described, and having the hook mounted as herein shown and described, and the weed guard projecting out so as to extend nearly to the barb of the hook, and to pass from the forward end of the lure to this point. All such changes and innovations and departures from the described structure are deemed to be circumscribed by the spirit and scope of the invention, except as the same may be necessarily limited by the appended claims or reasonable equivalents thereof.

What is claimed is:

1. A fishing lure comprising:
 a metallic, unperforated, trapezium-shaped spoon having a central longitudinal crease line extending from a point at one end of the spoon to a point at the other end of the spoon with the parts of the spoon on opposite sides of the crease line being configured as two congruent triangles, said spoon being made of a light reflective polished, metal, and being arched in a longitudinal plane from the point at one end to the point at the other end of said spoon, said spoon being further configured to be transversely arched over a major portion of its length;

a hook having an elongated shank secured by bonding to the spoon along the central longitudinal crease line over a major portion of the length of the spoon and having a barbed point connected to one end of the shank and spaced outwardly from the metallic spoon, said hook having a retrieving line eye secured to the other end of the shank adjacent the point at one end of the spoon; and a weed guard wire having a first end adjacent said retrieving line eye, and extending from said first end of the weed guard wire to a second end thereof positioned adjacent said barbed point, said weed guard wire and said hook being a single integral length of wire with the eye formed by a 360° bend in said wire between said weed guard wire and hook.

2. A fishing lure as defined in claim 1 wherein said weed guard wire has a flattened end portion adjacent said second end.

* * * * *